(12) United States Patent
Kinnard

(10) Patent No.: US 7,112,896 B2
(45) Date of Patent: Sep. 26, 2006

(54) POWER SYSTEM WITH LOAD MATRIX

(75) Inventor: J. R. Kinnard, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 769 days.

(21) Appl. No.: 10/093,127

(22) Filed: Mar. 7, 2002

(65) Prior Publication Data

US 2003/0168913 A1 Sep. 11, 2003

(51) Int. Cl.
*H02J 3/32* (2006.01)
*H02J 7/00* (2006.01)

(52) U.S. Cl. ............ 307/43; 307/64; 307/66; 323/906

(58) Field of Classification Search ............ 307/29, 307/30, 66, 64, 86, 37, 24, 26, 40, 43, 44, 307/38; 363/65, 70, 44, 45, 48, 46
See application file for complete search history.

(56) References Cited

U.S. PATENT DOCUMENTS

| | | | |
|---|---|---|---|
| 4,539,487 A | | 9/1985 | Ishii |
| 4,788,449 A | * | 11/1988 | Katz, deceased ............ 307/43 |
| 5,003,453 A | * | 3/1991 | Tighe et al. ................ 363/65 |
| 5,381,049 A | | 1/1995 | Onuma |
| 5,557,738 A | * | 9/1996 | Townsley et al. ............. 714/14 |
| 5,831,837 A | | 11/1998 | Coyne et al. |
| 5,886,431 A | | 3/1999 | Rutigliano |
| 6,121,693 A | | 9/2000 | Rock |
| 6,157,555 A | | 12/2000 | Hemena et al. |
| 2001/0024109 A1 | | 9/2001 | Sobkow et al. |

FOREIGN PATENT DOCUMENTS

| | | |
|---|---|---|
| EP | 0139870 A | 7/1984 |
| JP | 10 039936 A | 2/1998 |

* cited by examiner

*Primary Examiner*—Rajnikant B. Patel
(74) *Attorney, Agent, or Firm*—Meyertons Hood Kivlin Kowert & Goetzel, P.C.; B. Noël Kivlin

(57) ABSTRACT

A method and system for delivering electrical energy from multiple power supplies to multiple loads. Each power supply can have multiple independent outputs. Each load is coupled in a matrix pattern to at least one output from each of the different power supplies. This wiring system provides redundancy in that if one output or one power supply fails, an output from another power supply can still provide power to the loads. The number of over-current protection devices needed with the matrix wiring system is reduced compared to traditional wiring methods. Also, the level of safety is greater under the matrix approach rather than the traditional approach. The matrix wiring system also aids in pinpointing faulty components. Finally, the matrix wiring approach allows a gradual degradation of the power distribution system when failures of the loads or the power supply outputs occur.

19 Claims, 4 Drawing Sheets

POWER SYSTEM WITH LOAD MATRIX

FIELD OF THE INVENTION

The invention relates to the field of electrical power supplies, and more particularly to a method and system for delivering electrical energy from multiple power supplies to multiple loads in a safe and efficient manner.

BACKGROUND OF THE INVENTION

Electrical loads in computer systems and other multi-component electrical systems often use redundant power supplies; that is, they are often coupled to two or more power supplies. This redundancy allows the components to continue uninterrupted operation if one of the power supplies fails and may be important where continued operation of the system is critical or preferable, for example, in systems providing telephone services.

In a traditional method of coupling redundant power supplies to loads in a system, the power supplies are coupled to one or more buses. The loads are then coupled to the buses to receive the power from the power supplies. In such a system, however, there is a danger that a short or over-current situation in a load would damage all power supplies coupled to the load. If all power supplies fail, power could cease on all buses and the entire system would be without power. Thus, a short in only one load could cause a catastrophic failure in which all power supplies fail and power is removed from all the loads in the system.

To prevent such a catastrophic failure, where failure in one of the loads could short out one or more power supplies, each load is typically isolated from the power supplies; that is, a current-limiting device is typically added at each point where the power supplies are coupled to the loads to protect the supplies from a failure in the load. The number of current-limiting devices needed in such a system is typically equal to the number of loads in the system. The use of large numbers of current-limiting devices can result in significant costs.

Another potential issue with this traditional method of supplying power is that if a small number of buses are used in the system, the electrical power passing through each bus may often be greater than the maximum recommended by many safety agencies. As a result, if one of the loads required repair or replacement, power would have to be disconnected from all of the loads to allow safe access to the faulty load.

SUMMARY OF THE INVENTION

A power system is provided that comprises a plurality of power supplies and a plurality of loads. An embodiment of the power system is further comprised of a matrix coupling the power supplies to the loads. A system is provided that comprises a first power supply having a first output and a second output and a second power supply having a third output. An embodiment of the system is further comprised of a first load coupled to the first output and the third output and a second load coupled to the second output and the third output. A method is provided for identifying a failed electrical load in a system. An embodiment of the method comprises supplying power to each load in a system from a unique combination of power supply outputs and identifying a failed load by associating the failed load with a unique combination of failed power supply outputs. A method is provided for supplying electrical energy in a system. An embodiment of the method comprises delivering electrical energy from a plurality of power supplies, at least one of which has a plurality of outputs, to a plurality of loads wherein the loads are coupled to the outputs in a matrix.

DESCRIPTION OF THE DRAWINGS

The invention, together with further advantages thereof, may best be understood by reference to the following drawings in which.

DETAILED DESCRIPTION

Figure 1:
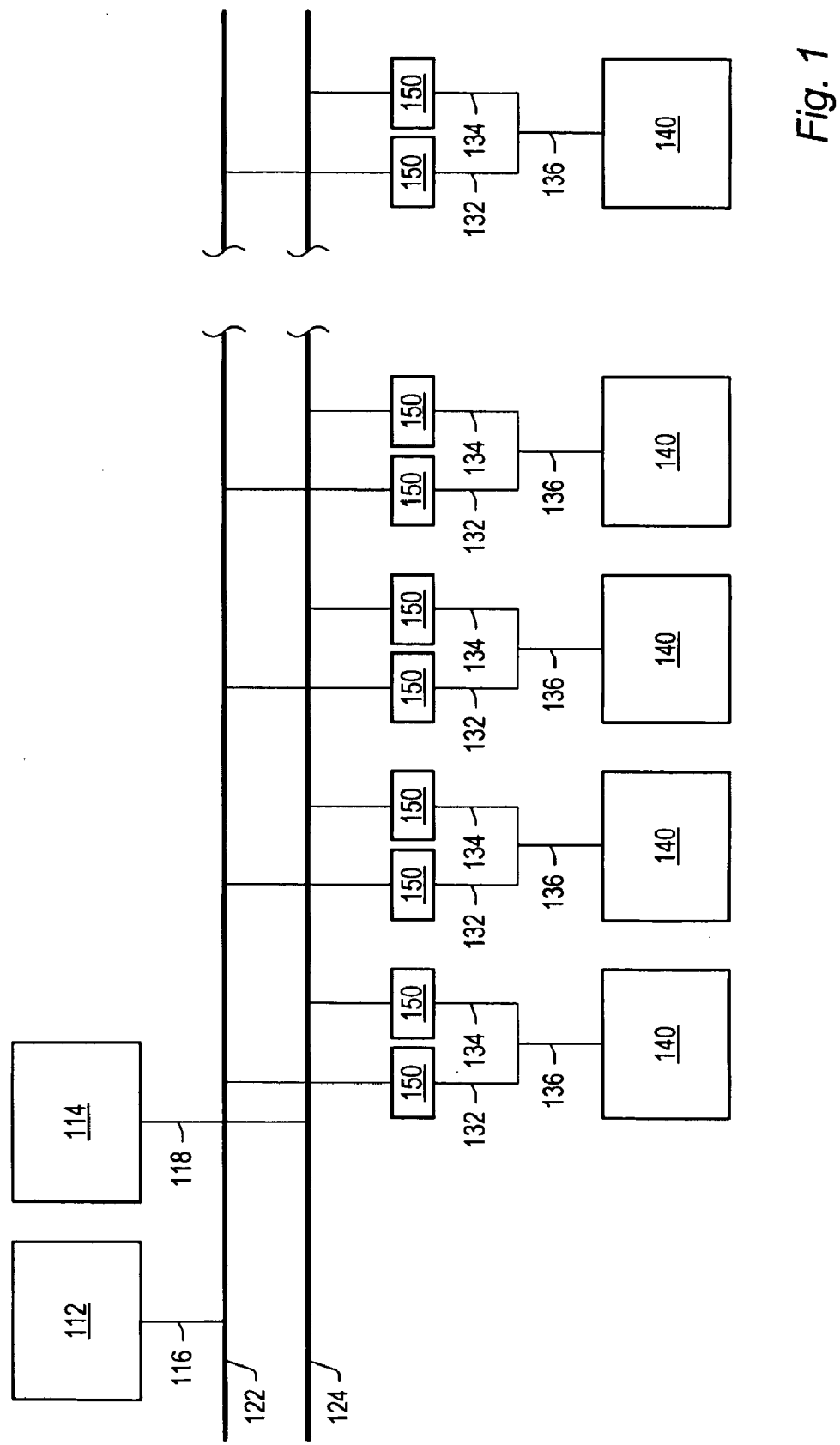
FIG. 1 is a block diagram of a traditional method of coupling multiple loads to multiple power supplies.

A traditional system in which multiple loads are coupled to multiple power supplies is shown in FIG. 1. The term "couple" is intended to mean either an indirect or direct electrical connection. Thus, if a first device couples to a second device, that connection may be through a direct electrical connection, or through an indirect electrical connection via other devices and connections. Power supplies 112 and 114 are coupled to buses 122 and 124 via connections 116 and 118. Multiple loads 140 receive electrical power from bus 122 via connections 132 and from bus 124 via connections 134. Connections 132 and 134 typically tie together to form a single connection 136 to a load 140. For purposes of this specification, the term "load" can refer to a single device or to multiple devices requiring electrical power. Thus, the boxes labeled 140 in FIG. 1 may contain multiple devices but each such box will be referred to as a single load. Current-limiting devices 150 are present on the connections 132 and 134 to the loads 140. For purposes of this specification, the terms "current-limiting device" and "current limiter" refer to any device capable of shutting off the flow of electric current when the current flow exceeds a predetermined maximum. Typical current-limiting devices include fuses, electromechanical circuit breakers, and electronic circuit breakers. The number of current-limiting devices 150 used in the configuration of FIG. 1 is twice the number of loads 140. In an alternative configuration, the current limiters 150 could be placed on the connections 136 instead of the connections 132 and 134. In this case the number of current-limiting devices 150 would be equal to the number of loads 140. It is typically preferable to place the current-limiting devices 150 on the connections 132 and 134 since a current-limiting device 150 on a connection 136 would represent a single point of failure that could disrupt both power supplies 112 and 114.

In another alternative configuration, the current limiters 150 could be placed on the connections 116 and 118 from the power supplies 112 and 114 rather than on the connections 136 to the loads 140. However, this configuration is typically not desirable since all of the current passing through a bus 122 or 124 would pass through a current limiter. This would necessitate the use of current limiters with an amperage rating greater than the combined maximum desired amperages of all of the loads 140. For example, if 25 loads 140 are present and if the maximum current level that is desired to pass through each load 140 is 10 amps, each bus 122 or 124 could theoretically carry 250 amps without any load 140 being in an overloaded status. In this case, the current limiters would need to be able to handle 250 amps without becoming overloaded. The use of a single current limiter with such a high amperage rating could allow over-current conditions to exist in individual loads. For example, if 24 of the 25 loads 140 carried 5 amps each, giving a total of 120 amps through those loads 140, the remaining load 140 could carry up to 130 amps without the 250 amp limit of the current limiter being exceeded. Thus, a current level far greater than the 10 amp maximum hypothetically desired for each load could exist in a load without causing an overloaded status in the current-limiting device. For this reason, current limiters are typically placed on the loads rather than on the power supplies when a traditional wiring method such as that depicted in FIG. 1 is used.

Figure 2:
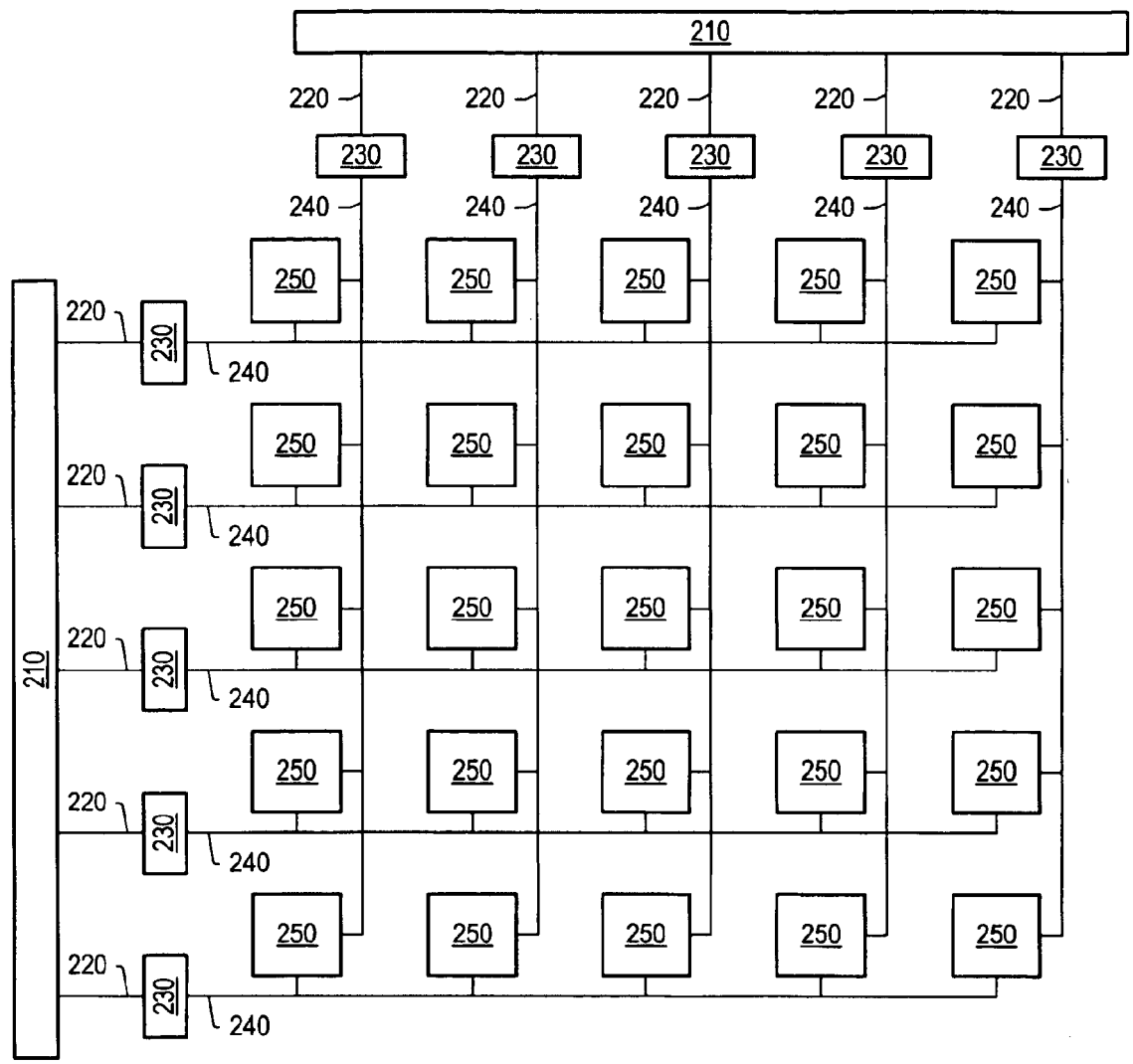
FIG. 2 is a block diagram of an embodiment of the matrix method for coupling multiple loads to multiple power supplies.

This traditional wiring method can be contrasted with the matrix wiring system used in the present invention. An embodiment of the matrix wiring system is shown in FIG. 2. Each of the two power supplies 210 has five outputs 220 from a single voltage source. Current-limiting devices 230 are coupled to each output 220. The number of current-limiting devices 230 is equal to the number of outputs 220. Buses 240 extend from each output 220 through the current limiters 230. The current limiters 230 are placed on each bus 240 at a point where all current flowing from an output 220 passes through a current limiter 230.

Electrical loads 250 are coupled to two buses 240, one from each power supply 210. Multiple devices may be present in each load 250 in FIG. 2. A load 250 does not necessarily have to be present at every intersection where two buses 240 meet, but every load 250 that is present is supplied by two outputs 220, one from each of the two power supplies 210. Coupling of the loads 250 to two different outputs 220 from two different power supplies 210 provides redundancy of connection paths. If power ceases to be provided through a single output 220 or through an entire power supply 210, power is still supplied to the loads from another power supply 210 through another output 220.

Figure 3:
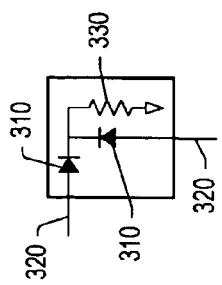
FIG. 3 is a detailed view of a typical load coupled to multiple power supplies using the matrix method.

A detailed view of a typical interface to a load (250 in FIG. 2) is shown in FIG. 3. Two diodes 310 are typically used to prevent coupling of the power supply outputs through the connections 320. A resistor 330 represents the device or devices coupled to the power supply outputs, i.e., the load.

Figure 4:
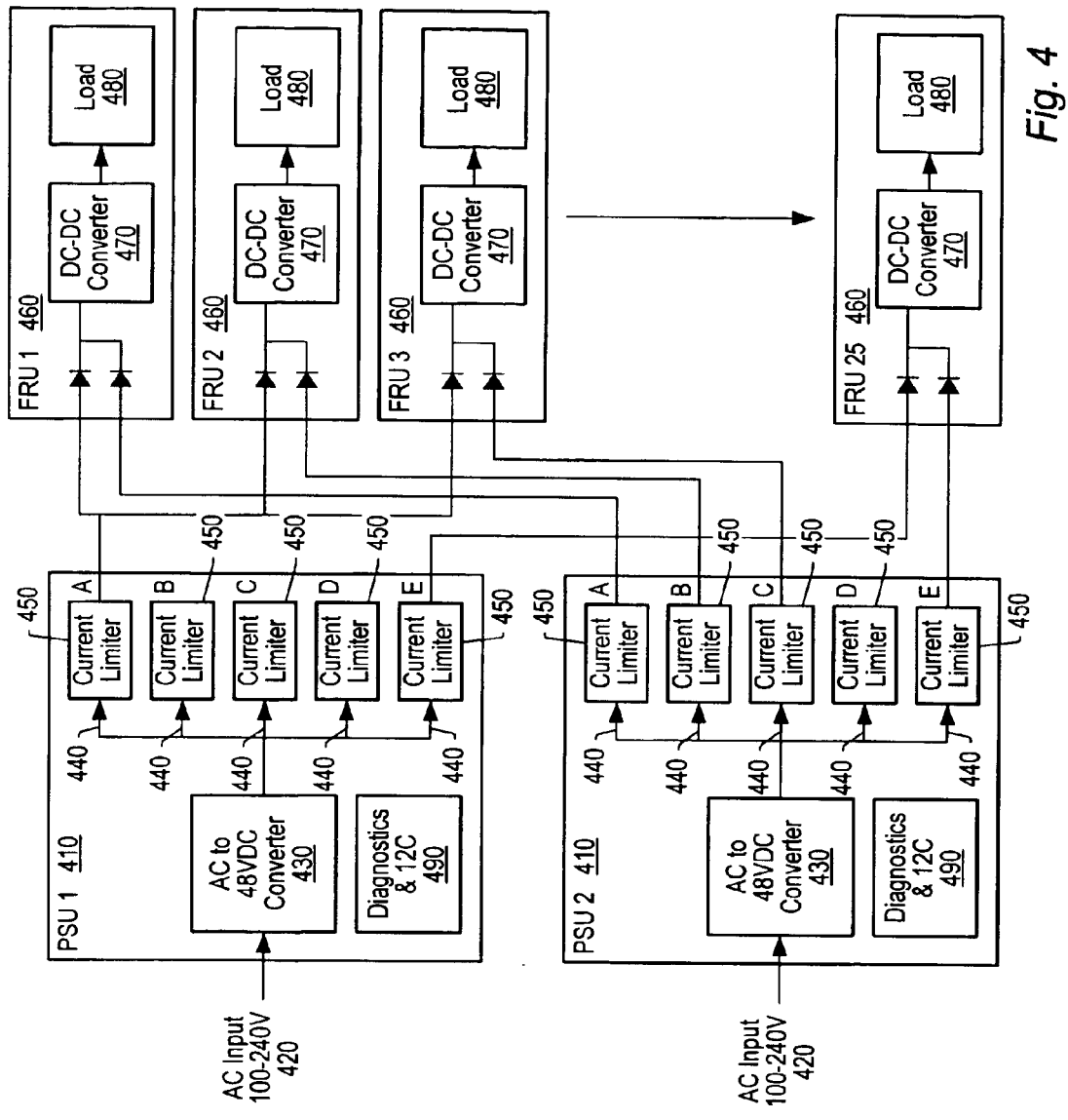
FIG. 4 is a detailed view of multiple loads coupled to multiple power supplies using the matrix method.

A detailed view of a typical embodiment of a power distribution system using the matrix wiring approach is shown in FIG. 4. Each of the two power supplies 410 has an alternating current (AC) input 420 with a voltage ranging between 100 volts and 240 volts. Each input 420 feeds into an AC to DC converter 430 to convert the 100–240 volts AC to 48 volts DC. Each converter 430 output divides into five outputs 440. In alternative embodiments, the converter 430 could provide a different DC voltage and divide into any number of outputs. Each output 440 passes through a current limiter 450 and is coupled to five FRUs 460, or field replaceable units. For the sake of clarity in the drawing, all of the FRUs 460 and all of the connections between the power supplies 410 and the FRUs 460 are not shown. Each FRU 460 typically comprises a DC-DC converter 470 and the actual load 480. The DC-DC converter 470 converts the DC voltage from the level supplied by the AC to DC converter 430 to the level required by a load 480. Diagnostic devices 490 are typically present in each power supply 410 to detect fault conditions and to balance the loads between the power supplies 410.

With the current limiters on the power supply outputs rather than on the loads, the number of current limiters is reduced from the number of loads (or twice the number of loads) in the traditional wiring method to the number of outputs in the matrix wiring system. For example, with the traditional wiring method of FIG. 1, if 25 loads 140 were present, 50 current limiters 150 would be needed. With the matrix wiring system of FIG. 2, only 10 current limiters 230 are needed for 25 loads 250. The reduction in the number of current limiters provides reductions in cost and complexity compared to the traditional wiring method.

The matrix wiring system also reduces the electrical power passing through the buses supplying the loads. Many safety agencies (for example, Underwriters Laboratories) recommend that access to energized areas within a device be restricted when the electrical power passing through a bus exceeds a predetermined level or current, 240 volt-amps under Underwriters Laboratories Standard 60950. Under the traditional wiring method shown in FIG. 1, only two buses 122 and 124 carry all of the electrical power to the loads 140. It would be desirable that each bus 122 and 124 carry a maximum of 240 volt-amps. The total power supplied by the buses 122 and 124 depends on the number of loads 140 and the power supplied to each load 140. For example, if each load 140 consumes 20 volt-amps and 25 loads 140 are present, the total power carried by the buses 122 and 124 would be 500 volt-amps. Under normal conditions, the power is balanced between the buses 122 and 124 and each bus 122 and 124 carries approximately 250 volt-amps. Since either bus 122 or 124 must provide the full power if the other fails, each bus 122 and 124 would have a capacity of 500 volt-amps. The 240 volt-amp maximum is exceeded in either case, so restricted access to the loads 140 would be recommended and only trained and authorized personnel would be allowed to perform repair or replacement work on the device containing the loads 140. In addition, electrical power would typically be required to be disconnected from all of the loads 140 in order for repair or replacement work to be performed on any one load 140.

By contrast, each bus 240 in the matrix wiring system shown in FIG. 2 would carry less power under similar circumstances. If the power consumed by each of the 25 loads 250 is again 20 volt-amps, a total power of 500 volt-amps would again be present. If the power is again evenly balanced between the buses 240, each of the ten buses 240 would carry only 50 volt-amps. Under a fault condition with only one power supply 210 providing power, each of the ten buses 240 would carry only 100 volt-amps. Since the power levels in both situations are well below the 240 volt-amp maximum, no restrictions on access to the loads 250 would be needed. Personnel without specialized training would be allowed access to the energized loads 250 to perform repairs or replacements, thus reducing labor costs for an enterprise using devices coupled in a matrix wiring system. Also, the capability of performing repair or replacement work while the loads 250 are energized can increase the amount of time the loads 250 are in operation.

The matrix wiring system also provides the ability to pinpoint the location of a faulty load. With the traditional wiring approach depicted in FIG. 1, if 25 loads 140 were present, 50 current-limiting devices 150 would also be present. All 50 current limiters 150 would need to be inspected to determine whether any are in an overloaded status and thus determine if any load 140 has a fault.

In the matrix wiring system of FIG. 2, since ten buses 240 feed the 25 loads 250, only ten current-limiting devices 230 are needed. If an overload condition existed on one of the loads 250, two current limiters 230 would show an overload status. Only ten current limiters 230 would need to be inspected to determine which two were overloaded. Since each load 250 is coupled to a unique combination of outputs 220, the faulty load 250 will be coupled to a unique combination of overloaded current limiters 230. The faulty load 250 can be located by associating the combination of overloaded current limiters 230 to a corresponding load 250. For example, if current limiters 34 and 38 in FIG. 5 were found to be in overloaded status, it could easily be determined that a fault must exist in load 28 since load 28 is the only load coupled to the unique combination of current limiters 34 and 38.

Figure 5:
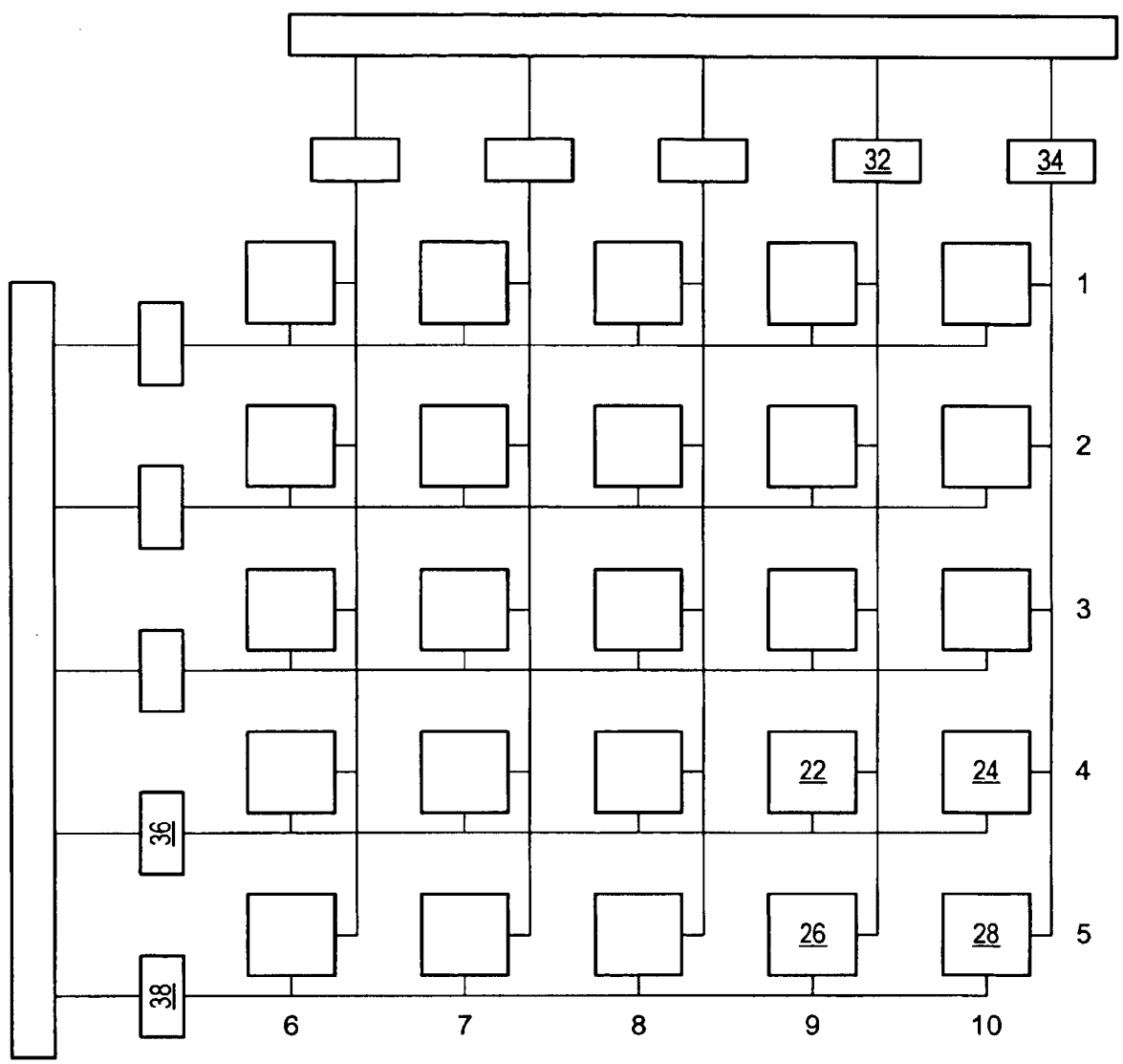
FIG. 5 is a block diagram of an embodiment of the matrix method for coupling multiple loads to multiple power supplies.

In an alternative to the configuration in FIGS. 2 and 5, the current limiters are not external to the power supplies. Instead, over-current protection devices internal to the power supplies, such as fuses, are used to limit the flow of current. In this case, a power supply output would cease to provide power in a current overload situation and a faulty load could be located by associating a combination of de-energized power supply outputs to a corresponding load.

The matrix wiring system allows gradual degradation of the integrity of the power distribution process when failures of the power supplies or outputs occur. In the traditional wiring method of FIG. 1, if one of the power supplies 112 or 114 fails, the other power supply 112 or 114 must supply all power. If the second power supply also fails, all loads 140 will completely and simultaneously lose all power.

In the matrix wiring system of FIG. 2, all buses 240 are independent. An open circuit in one bus 240 will not cause a disruption of an entire power supply 210 or of any other bus 240. If an open circuit occurs in one of the outputs 220 feeding a horizontal bus 240, for example, all loads 250 coupled to that horizontal bus 240 will lose power from one of their two sources. Power will still be supplied to these loads 250 by the outputs 220 coupled to vertical buses 240. If an open circuit occurs in one of these outputs 220 feeding a vertical bus 240, the load 250 coupled to the two open outputs 220 will lose all power. However, all other loads 250 will continue to be supplied by at least one output 220. If open circuits occur in further outputs 220, only those loads 250 coupled to two open outputs 220 will lose all power.

A similar gradual degradation of the power distribution system occurs when one or more of the loads 250 fail. If a load 250 short-circuits, the current-limiting devices 230 through which power is supplied to the load 250 will go into an overloaded status and power will be shut off to the two buses 240 supplying power to the shorted load 250. All other loads coupled to these two buses will continue to operate but will be fed by only one output 220. If a second load 250 short-circuits, at least one additional current limiter 230 will go into overloaded status. If the second shorted load 250 is coupled to two energized buses 240, both buses 240 will be de-energized. If the second shorted load 250 is coupled to one energized bus 240 and one bus 240 that has already been de-energized by the failure of the first load 250, the energized bus 240 will be de-energized. All loads 250 coupled to two de-energized buses 240 will lose power.

For example, if load 28 in FIG. 5 short-circuits, current limiters 34 and 38 will go into overloaded status and will shut off power to all loads along horizontal row 5 and vertical column 10. The other loads along row 5 and column 10 will receive power from only one source. If, for example, load 22 also short-circuits, current limiters 32 and 36 will go into overloaded status and will shut off power to all loads along row 4 and column 9. This will cause a loss of all power to loads 24 and 26 since those loads are at row 4, column 10 and row 5, column 9, respectively and thus are coupled to two de-energized buses. In a similar manner, any load present at the intersection of a row and a column that have become de-energized due to the failure of other loads will lose power. This gradual loss of power to only a few loads at a time can be contrasted with the traditional wiring method in which the failure of both power supplies will cause the simultaneous loss of power to all loads.

In alternative embodiments, different sizes of matrices besides the five-by-five matrix depicted in FIGS. 2 and 5 could be used. For example, if 30 loads needed to be coupled in a matrix wiring system, a typical configuration would be the use of two power supplies, each having six outputs. This would provide 36 available locations at which loads could be placed. In this case, six locations would be left unused. Alternatively, two dissimilar power supplies could be used, one with six outputs and one with five outputs, giving a total of 30 available load locations. In actual practice two dissimilar power supplies would rarely be used. Users of a matrix wiring system would typically purchase power supplies with the same number of outputs in order to facilitate the product requisitioning process.

In one embodiment, a computer system comprises a microprocessor-based computing device, a plurality of power supplies, a plurality of loads, and a matrix coupling the power supplies to the loads. The computer system further comprises a current-limiting device internal to each power supply, and each power supply has a plurality of outputs. Also, the matrix couples a unique combination of outputs to each load. The computer system further comprises a current-limiting device coupled to each output at a point where all current flowing from the output passes through the current-limiting device.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power system comprising:
    a plurality of power supplies, each including a plurality of outputs;
    a plurality of loads; and
    a matrix coupling the outputs of each of the power supplies to the loads, wherein the matrix includes a number of rows and a number of columns;
    wherein a first power supply of the plurality of power supplies includes a number of outputs corresponding to the number of rows in the matrix and a second power supply of the plurality of power supplies includes a number of outputs corresponding to the number of columns in the matrix.

2. The power system of claim 1 further comprising a plurality of buses coupled to the plurality of outputs of the power supplies, wherein each of the plurality of loads are coupled at an intersection of a bus from the first power supply and a bus from the second power supply, wherein the intersection includes a first and a second diode to prevent the coupling of the outputs of the first and second power supplies.

3. The power system of claim 1 wherein the matrix couples a unique combination of outputs to each load.

4. The power system of claim 1 further comprising a plurality of current-limiting devices coupled to the plurality of outputs of the power supplies, wherein the number of current-limiting devices corresponds to the number of outputs of the plurality of power supplies, wherein a current-limiting device is coupled to each output at a point where all current flowing from the output passes through the current-limiting device.

5. A computer system comprising:

a microprocessor-based computing device;

a plurality of power supplies, each including a plurality of outputs;

a plurality of loads; and a matrix coupling the outputs of each of the power supplies to the loads, wherein the matrix includes a number of rows and a number of columns;

wherein a first power supply of the plurality of power supplies includes a number of outputs corresponding to the number of rows in the matrix and a second power supply of the plurality of power supplies includes a number of outputs corresponding to the number of columns in the matrix.

6. The computer system of claim 5 further comprising a current-limiting device internal to each power supply.

7. The computer system of claim 5 further comprising a plurality of buses coupled to the plurality of outputs of the power supplies, wherein each of the plurality of loads are coupled at an intersection of a bus from the first power supply and a bus from the second power supply, wherein the intersection includes a first and a second diode to prevent the coupling of the outputs of the first and second power supplies.

8. The computer system of claim 5 wherein the matrix couples a unique combination of outputs to each load.

9. The computer system of claim 5 further comprising a plurality of current-limiting devices coupled to the plurality of outputs of the power supplies, wherein the number of current-limiting devices corresponds to the number of outputs of the power supplies, wherein a current-limiting device is coupled to each output at a point where all current flowing from the output passes through the current-limiting device.

10. The power system of claim 1 wherein at least one of the power supplies includes internal current-limiting devices coupled to each output.

11. The power system of claim 1 wherein each load is coupled to an output from each of the plurality of power supplies via the matrix.

12. The power system of claim 1 wherein if an oven circuit occurs in one of the outputs of the first power supply, the loads coupled to the one of the outputs will continue to receive power from the plurality of outputs of the second power supply.

13. The power system of claim 12 wherein if an open circuit occurs in one of the outputs of the first power supply and in one of the outputs of the second power supply, only the load coupled to both the two open outputs will lose power.

14. A method for supplying electrical energy in a system comprising:

delivering electrical energy from a plurality of power supplies, each including a plurality of outputs, to a plurality of loads, wherein the loads are coupled to the outputs in a matrix, wherein the matrix includes a number of rows and a number of columns, and wherein a first power supply of the plurality of power supplies includes a number of outputs corresponding to the number of rows in the matrix and a second power supply of the plurality of power supplies includes a number of outputs corresponding to the number of columns in the matrix; and limiting the current being delivered to each load by coupling a current-limiting device at a point where all current flowing from an output passes through the current-limiting device.

15. The method of claim 14 wherein the electrical energy is delivered to each load with a unique combination of outputs from the power supplies.

16. The method of claim 14 further comprising:

identifying failed outputs by identifying overloaded current-limiting devices associated with the failed outputs; and identifying a failed load by associating the failed load with a unique combination of failed outputs.

17. The method of claim 14 further comprising coupling a load at an intersection of a bus from the first power supply and a bus from the second power supply, wherein the intersection includes a first and a second diode to prevent the coupling of the outputs of the first and second power supplies.

18. The method of claim 14 further comprising limiting the current required on each output below a predetermined current for safety purposes.

19. The method of claim 18 further comprising limiting the current required on each output below a predetermined current to allow each load to be replaced without disconnecting electrical power from the load.

* * * * *